(12) United States Patent
Vresk (10) Patent No.: US 8,529,359 B1
(45) Date of Patent: Sep. 10, 2013

(54) SHAFT COUPLING SYSTEM

(76) Inventor: Frank Vresk, Wauwatosa, WI (US)

( * ) Notice: Subject to any disclaimer, the term of this patent is extended or adjusted under 35 U.S.C. 154(b) by 0 days.

(21) Appl. No.: 13/308,693

(22) Filed: Dec. 1, 2011

(51) Int. Cl.
F16D 3/08 (2006.01)

(52) U.S. Cl.
USPC .......................................... 464/82; 464/137

(58) Field of Classification Search
USPC .................... 464/50, 69, 82, 83, 86, 137, 138
See application file for complete search history.

(56) References Cited

U.S. PATENT DOCUMENTS

| | | | | |
|---|---|---|---|---|
| 3,218,828 A | * | 11/1965 | Thelander | 464/82 |
| 3,375,911 A | * | 4/1968 | Smirl | 464/82 X |
| 3,726,108 A | * | 4/1973 | Geislinger | 464/69 X |
| 3,959,988 A | | 6/1976 | McNamee | |
| 4,033,144 A | | 7/1977 | Allen | |
| 4,164,877 A | * | 8/1979 | Chivari | |
| 4,196,597 A | | 4/1980 | Robinson | |
| 4,282,723 A | | 8/1981 | Schmidt | |
| 4,317,339 A | | 3/1982 | Schmidt | |
| 4,331,004 A | | 5/1982 | Schmidt | |
| 4,347,716 A | * | 9/1982 | Hackforth et al. | 464/83 |
| 4,464,138 A | | 8/1984 | Decker | |
| 6,077,165 A | | 6/2000 | Jewell | |

\* cited by examiner

Primary Examiner — Gregory Binda
(74) Attorney, Agent, or Firm — Boyle Fredrickson S.C.

(57) ABSTRACT

A shaft coupling system that does not require lubrication and that can accommodate shaft misalignment and end play. The shaft coupling system includes first and second plates that are connected to each other by a series of links. Each link is made from a substantially rigid material and extends angularly across portions of end surfaces of the first and second plate. Each link includes a curved segment that extends in a direction that is generally parallel to central axes of the first and second plates and that can bend and restore dynamically to accommodate the relative shaft movement while transferring torque between the first and second plates.

17 Claims, 5 Drawing Sheets

SHAFT COUPLING SYSTEM

BACKGROUND OF THE INVENTION

1. Field of the Invention

The invention relates to shaft couplers that can connect a pair of rotating shafts to each other.

2. Discussion of the Related Art

Shaft couplers to connect rotating shafts to each other are known. Flexible shaft couplers are known that can be used to accommodate misalignment of the shafts that are coupled together. Some flexible shaft couplers are sealed units that are grease packed and/or otherwise lubricated. Some flexible shaft couplers do not require lubrication but instead include metal discs or the like, or polymeric cushions, between paired rotating metallic hubs.

SUMMARY OF THE INVENTION

The present inventor has recognized that prior art lubricated shaft couplers may require a substantial amount of ongoing lubrication-related maintenance. The inventor has further recognized that polymeric cushions may degrade over time which may compromise their flexing characteristics. The inventor has further recognized that flexible shaft couplers that incorporate metal discs, or the like, require such metal flexing components to undergo large amounts of flexing relative to their sizes; in other words, high amplitude stress that may induce flex fatigue which may compromise their flexing characteristics and shorten their use life. The present invention contemplates a shaft coupling system that addresses these and other inventor-identified problems and drawbacks of the prior art.

In accordance with an aspect of the present invention, a shaft coupling system is provided that has a pair of plates or other members that are connected to each other with one or more links that are substantially longer than a distance between the plates. This may allow the one or more of the links to bend a relatively small amount, as compared to the overall length of the one or more links, to accommodate relative movement between the pair of plates, which may ensure that the flexing stresses experienced by the one or more links are below corresponding fatigue limits by a desired amount.

In accordance with another aspect of the invention, the shaft coupling may include a first shaft engagement member, which may be in the form of a first plate, that can be connected to and rotate in unison with a first shaft. A second shaft engagement member, which may be in the form of a second plate, is generally aligned with the first plate and can be connected to and rotate in unison with a second shaft. A link has a first end that is connected to the first plate and a second end that is connected to the second plate so that torque can be transmitted between the first and second plates through the link. The link may extend angularly between the first and second plates and may be resiliently bendable with respect to at least one of the first and second plates. This may allow the shaft coupling system to connect a pair of shafts while compensating for misalignment and/or relative movements of the shafts with respect to each other, without requiring lubrication or a fully sealed unit.

In accordance with another aspect of the invention, the link may include a length of substantially rigid material that can dynamically bend away from and toward a neutral position during rotation of the first and second plates. This may allow the first and second plates to move with respect to each other while remaining rotationally coupled, so that the shaft coupling system can accommodate at least one of (i) axial misalignment of the first and second shafts, (ii) radial misalignment of the first and second shafts, and (iii) axial float of the first and second shafts.

In accordance with yet another aspect of the invention, the substantially rigid material of the link is a metal wire that includes a curved segment that extends along an arcuate path between the first and second ends of the link. The curved segment may extend outwardly from at least one of the first and second plates in a direction that is generally parallel to a central axis of the at least one of the first and second plates. The curved segment may define a generally U-shaped profile, and an apex of the U-shaped curved segment may face toward one of the first and second shafts. This may provide a link that is long enough so that it can sufficiently bend during use to allow the first and second plates to move with respect to each other while remaining rotationally coupled so as to accommodate shaft misalignment and/or relative movements of the first and second shafts.

In accordance with yet another aspect of the invention, multiple links interconnect the first and second plates at multiple locations that may be spaced from each other about a periphery or outer portions of the first and second plates. The multiple links may be positioned so that first ends of the multiple links are relatively nearer the axes of rotation of the first and second shafts and second ends of the multiple links are relatively further from the axes of rotation of the first and second shafts. The multiple links may overlap and be angled with respect to each other so that each link defines an imaginary line that connects the first and second ends thereof and that projects through an adjacent link. This may allow the multiple links to be arranged tangentially with respect to circular outer perimeters of the first and second plates so that each link spans across a zone of connection that is overlapped at each side by a zone of connection of an adjacent link. This may allow ends of each of the links to move longitudinally and transversely with respect to each other which may facilitate accommodating shaft misalignment and/or relative movements of the first and second shafts while permitting transmission of large torques through the links.

In accordance with yet another aspect of the invention, multiple links may extend between and connect the end surfaces of the first and second plates to each other. The second plate may have a larger diameter than the first plate so that an annular portion of the end surface of the second plate extends radially outward beyond an outer perimeter of the first plate. The second ends of the multiple links may be connected to, for example, extend longitudinally into the annular portion of the end surface of the second plate. The second plate may include a cavity that extends axially into the end surface thereof. The cavity may be located radially inward of the annular portion of the end portion of the second plate. The first plate may be concentrically nested, at least partially, within the cavity of the second plate. The first plate may include a cavity that extends axially into an end surface that faces toward the second plate. At least a portion of the second plate, for example, a raised central segment, may extend into the cavity of the first plate. The first and second plates may include rims that are defined as annular projections that extend from outer perimeters of the first and second plates in axial directions. The multiple links may connect the first and second plates to each other at their respective rims. This may allow the first and second plates to at least partially nest within each other which may provide a relatively axially compact configuration to the shaft coupling system.

In accordance with another aspect of the invention, a first hub is provided that interconnects the first shaft and the first plate. A second hub is provided that interconnects the second shaft and the second plate. Each of the first and second hubs may include a longitudinally extending collar that tapers to fit a tapering bore of the respective first and second plates. This may allow the shaft coupling system to be adapted to a variety of shafts and may ensure proper alignment of the hub(s) and thus the shaft(s) with the corresponding first or second plate.

Various other features, objects, and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION

Figure 1:
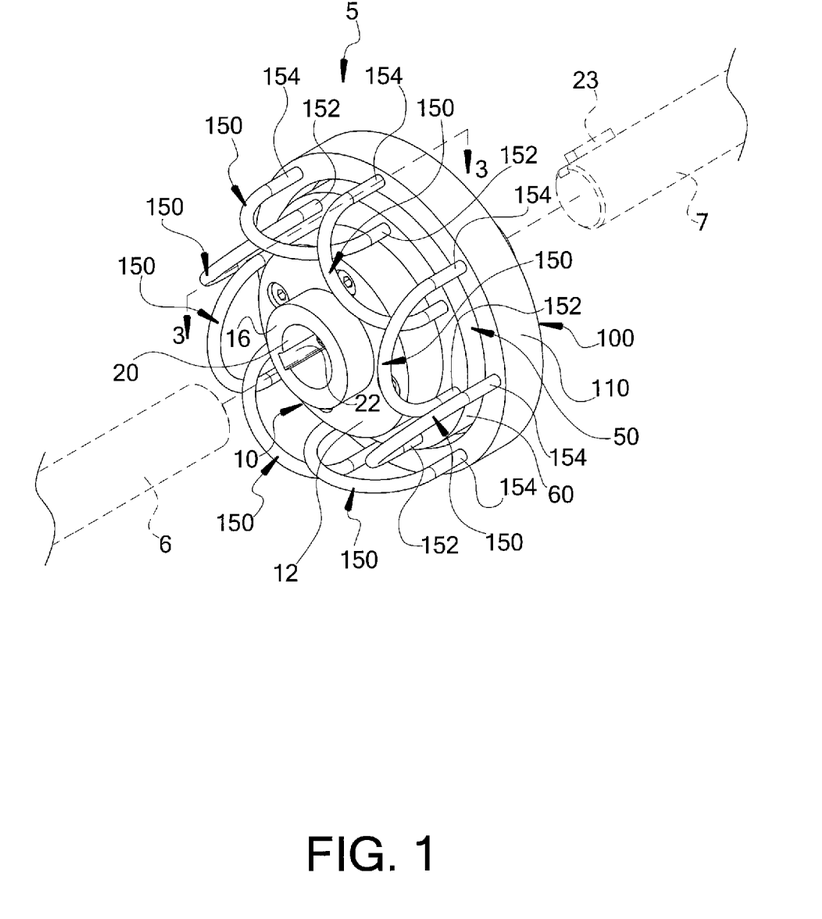
FIG. 1 is an isometric view of a shaft coupling system in accordance with the present invention.

FIG. 1 shows a shaft coupling system 5 that can be used to connect a first shaft 6 to a second shaft 7 and accommodate movement of the shafts 6, 7 relative to one another. The shaft coupling system 5 can flex, as described in greater detail elsewhere herein, to accommodate at least one of (i) axial misalignment of the shafts 6, 7, (ii) radial misalignment of the shafts 6, 7, (iii) axial float of one or both of the shafts 6, 7, and/or (iv) torsional vibration(s) that may be transmitted through one or both of the shafts 6, 7. In a representative application, the shaft coupling system 5 is incorporated into a motor drive transmission, e.g. to couple a driven motor output shaft to an input drive shaft of an item of equipment, such as a pump or the like. It is also understood that the shaft coupling system 5 may be used for other relatively high torque transmitting power transmission equipment including those using electric motors or internal combustion engines such as prime movers, and/or other shaft coupling applications.

Figure 2:
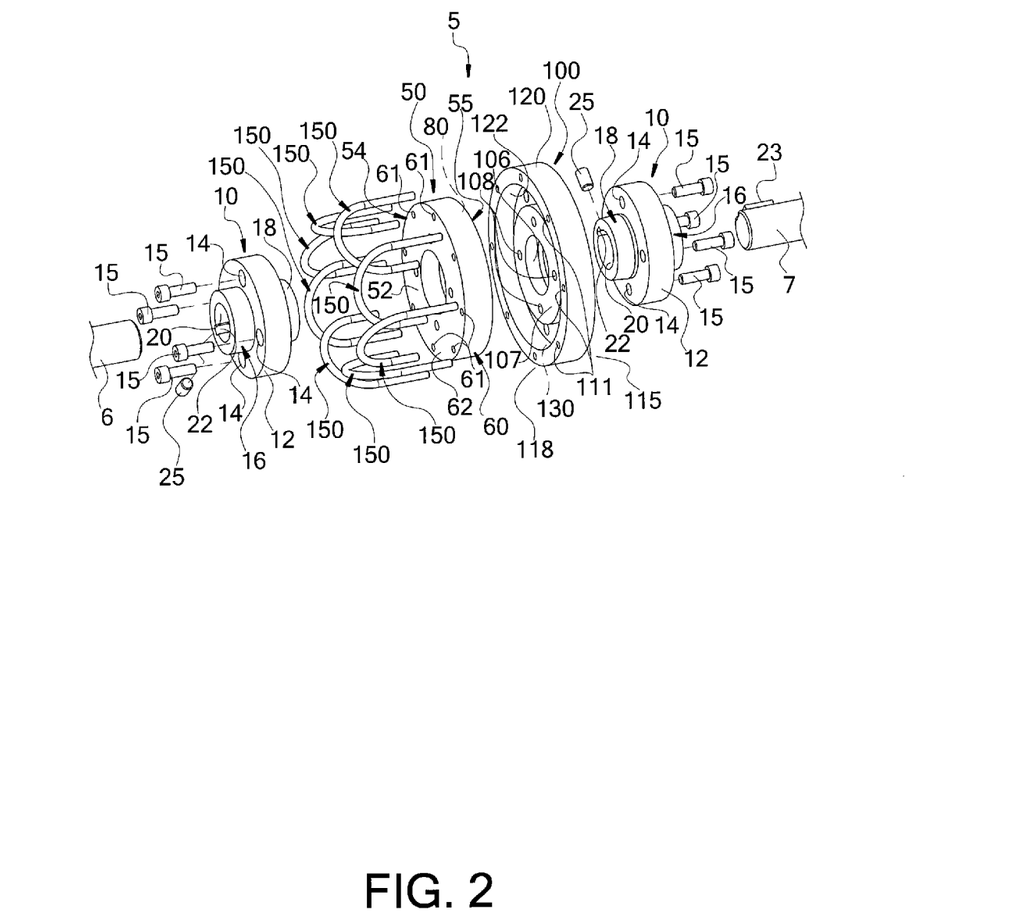
FIG. 2 is an exploded isometric view of the shaft coupling system of FIG. 1.

Referring now to FIGS. 1 and 2, shaft coupling system 5 includes a pair of hubs 10 that connect the shafts 6, 7 to respective first and second plates 50, 100. One or more links 150 connect the first and second plates 50, 100 to each other. The links 150 rotationally couple the first and second plates 50, 100 to each other while allowing them to move relative to each other to accommodate misalignment and/or other movements of the shafts 6, 7 with respect to each other.

Figure 3:
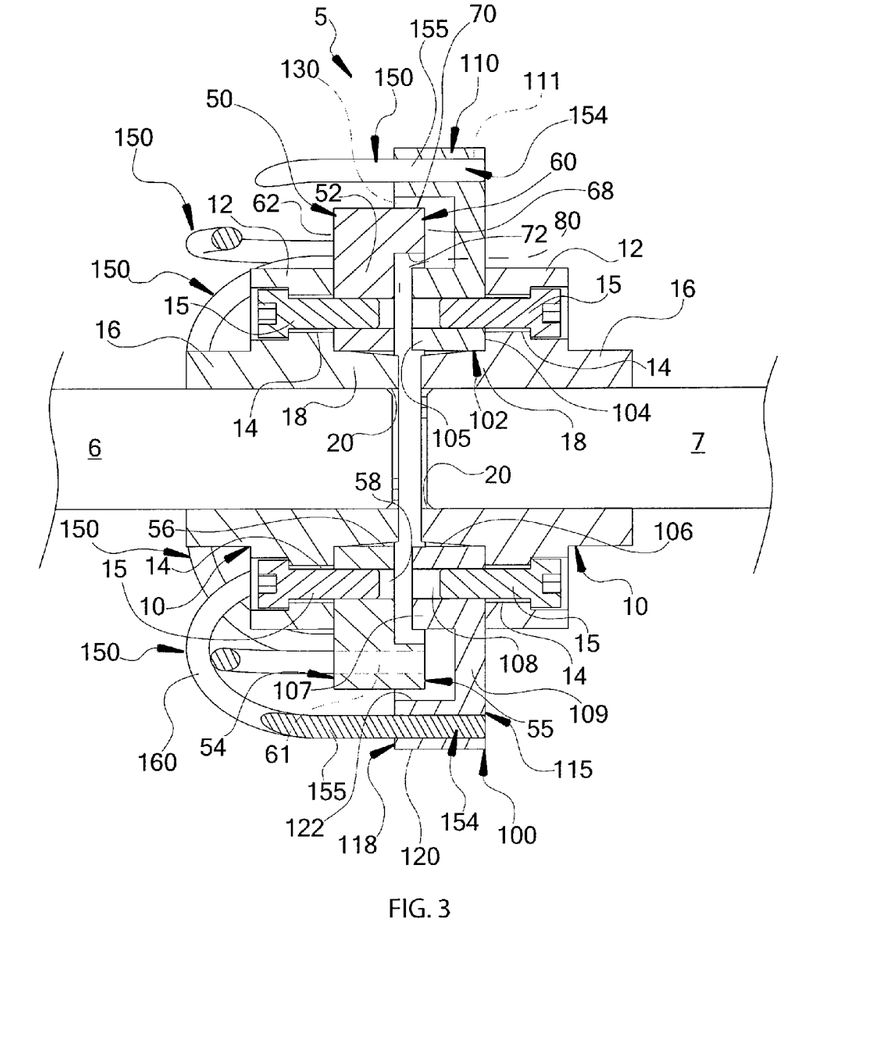
FIG. 3 is a cross-sectional view of the shaft coupling system of FIG. 1, taken at line 3-3 of FIG. 1

Referring now to FIGS. 2 and 3, each hub 10 includes a main flange 12 that extends radially from an intermediate portion of the hub 10, partway along a length of the hub 10. Multiple bores 14 extend longitudinally through the main flange 12. The bores 14 are spaced from each other about a periphery of the main flange 12 and are configured to accept screws 15 or other suitable fasteners therethrough. Each hub 10 includes an outer collar 16, which may be in the form of a generally cylindrical projection that extends longitudinally away from a central portion of the flange, away from the respective first and second plates 50, 100 in the entire assemblage (FIG. 3). Each hub 10 includes an inner collar 18 that extends from the main flange 12 in the opposite direction of outer collar 16 or toward the respective first and second plates 50, 100. Inner collar 18 has a generally cylindrical projection that tapers downwardly along its length from its point of attachment to the main flange 12. A central bore 20 extends continuously through the outer and inner collars 16, 18 and main flange 12. The central bore 20 is configured to receive the shaft 6, 7 therein. The central bore 20 includes a keyway 22 that extends radially into the hub 10 and that is configured to receive a key 23 on the shaft 6, 7. A set screw 25 locks the hub 10 in place by advancing through a bore (not shown) in the outer collar 16 that extends through the keyway 22, allowing the set screw 25 to engage the key 23 of the respective shaft 6, 7.

Still referring to FIGS. 2 and 3, first plate 50 engages the hub 10 that is connected to the first shaft 6 so that the first plate rotates in unison with the first shaft 6. First plate 50 includes a generally circular flange 52 that defines opposing outer and inner ends 54, 55. A central bore 56 extends longitudinally through a central portion of the flange 52. The central bore 56 is tapered and configured to concentrically receive the tapered inner collar 18 of the respective hub 10. Multiple bores 58 (FIG. 3) extend longitudinally through the flange 52 and align with the bores 14 of the hub main flange 12. The bores 58 of flange 52 are threaded to engage the threads of screws 15. This allows the screws 15 to extend through the bores 14, 58 and fasten the hub 10 to the first plate 50 with the respective flanges 12, 52 in face-to-face engagement with each other.

Referring now to FIG. 3, first plate 50 includes a rim 60 that extends as an annular projection from an outer periphery of the flange 52 toward the second plate 100. The rim 60 has an outer end surface 62 that is continuous or common with an end surface of the flange 52 that faces toward the shaft 6 and away from the second plate 100. An inner end surface 68 of the rim 60 is an annular surface that is spaced in a longitudinal direction from the flange 52 and that faces toward the second plate 100. Rim 60 includes an outer circumferential surface 70 and an opposing inner circumferential surface 72. The inner circumferential surface 72 of the rim 60 defines an outer periphery of a cavity 80 that extends axially into the inner end 55 of the first plate 50.

Referring still to FIG. 3, second plate 100 engages the hub 10 that is connected to the second shaft 7 so that the second plate rotates in unison with the second shaft 7. Second plate 100 includes a generally circular flange 102 and defines opposing outer and inner ends 104, 105.

A central bore 106 extends longitudinally through a central portion of the flange 102. The central bore 106 is tapered and configured to concentrically receive the tapered inner collar 18 of the respective hub 10. Multiple bores 108 extend longitudinally through the flange 102 and align with the bores 14 of the hub main flange 12. As was described above with respect to bores 58 of flange 52, bores 108 are threaded to engage the threads of screws 15, allowing the screws 15 to extend through the bores 14, 108 and fasten the hub 10 to the second plate 100 with the respective flanges 12, 102 in face-to-face engagement with each other.

Referring now to FIG. 3, second plate 100 includes a rim 110 that extends as an annular projection from an outer periphery of the flange 102 toward the first plate 50. The rim 110 has an outer end surface 115 that is continuous or common with an end surface of the flange 102 that faces toward the shaft 7 and away from the first plate 50. An inner end surface 118 of the rim 110 is an annular surface that is spaced in a longitudinal direction from the flange 102 and that faces toward the first plate 50. Rim 110 includes an outer circumferential surface 120 and an opposing inner circumferential surface 122. The inner circumferential surface 122 of the rim 110 defines an outer periphery of a cavity 130 that extends axially into the inner end 105 of the second plate 100. In this embodiment, the cavity 130 defines a generally annular perimeter shape, or in other words, is configured as a circular groove that extends into the inner end 105 of the second plate 100 at an intermediate portion 109 of the second plate 100. The intermediate portion 109 and the cavity 130 are provided concentrically between the rim 110 and a central portion 107 that is defined toward a central axis of the flange 102. In this way, at the inner end 105 of the second plate 100, the central portion 107 and the rim 110 define raised segments when compared to the intermediate portion 109.

Figure 4:
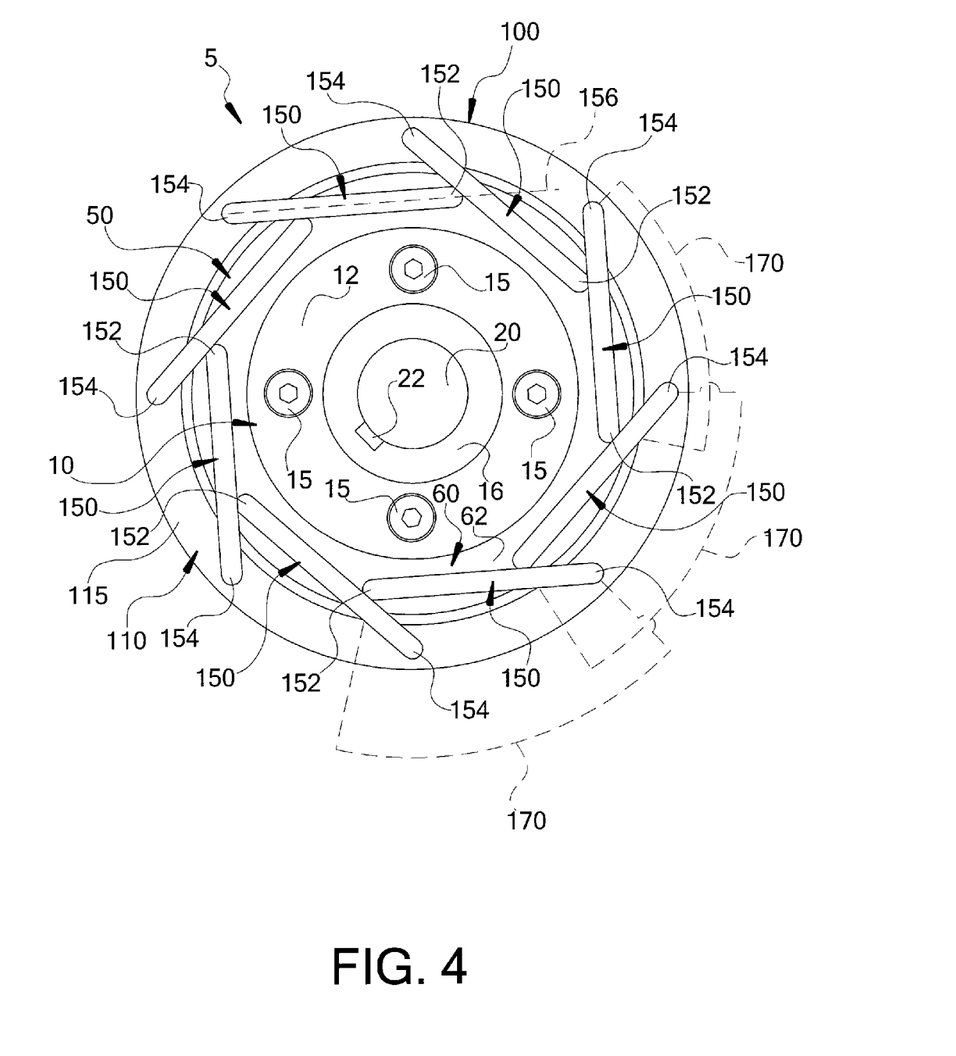
FIG. 4 is an end elevation view of the shaft coupling system of FIG. 1.

Referring now to FIGS. 3 and 4, the first and second plates 50, 100 are generally coaxially aligned with each other. The second plate 100 has a larger diameter than the first plate 50 so that the annular shaped inner end surface 118 of the rim 110 is provided outwardly of the rim 60 of the first plate 50. As illustrated in FIG. 3, the first and second plates 50, 100 partially longitudinally overlap each other. In this way, the overall width of the assembled first and second plates 50, 100 is less that the sum of the widths of the first and second plates 50, 100. The first and second plates 50, 100 are also partially concentrically nested within each other. The central portion 107 of the second plate 100 extends into the cavity 80 of the inner end 55 of the first plate 50. Accordingly, the rim 60 of the first plate 50 concentrically surrounds the central portion 107 of the second plate 100. The rim 60 of the first plate extends into the cavity 130 of the inner end 105 of the second plate 100. Accordingly, the rim 110 of the second plate 100 concentrically surrounds the rim 60 of the first plate.

Referring again to FIG. 3, links 150, which are described in greater detail elsewhere herein, provide a flexible connection between the first and second plates 50, 100 so that the first and second plates 50, 100 can move with respect to each other while transmitting torque therebetween. Such relative movement between the first and second plates 50, 100 may be facilitated or enhanced by clearances defined between the first and second plates 50, 100.

FIG. 3 shows the first and second plates 50, 100 as having radial clearances that are defined by respective portions of cavities 80, 130. The radial clearances are defined between the first and second plate rims 60, 110 and between the first plate rim 60 and the second plate central portion 107. Such clearances provided by the cavities 80, 130 provide sufficient space between the first and second plates 50, 100 to allow the first and second plates 50, 100 to move radially with respect to each other while being rotationally coupled or locked to each other.

Still referring to FIG. 3, the first and second plates 50, 100 are axially spaced from each other so as to define an axial clearance or an axial component of the clearance between the first and second plates 50, 100. As such, the inner end surface 68 of the first plate rim 60 is axially spaced from the intermediate portion 109 of the second plate 100. The flange 52 of the first plate 50 is axially spaced from the central portion 107 of the second plate 100. This provides the overall clearance between the first and second plates 50, 100 with multiple segments so as to define both axially arranged and radially arranged spaces between the first and second plates 50, 100, for example, defining a generally U-shaped or sideways U-shaped clearance when viewed in cross-section. It is understood that the first and second plates 50, 100 may axially abut each other in other implementations. Regardless of the particular location(s) and configuration(s) of clearance(s) between the first and second plates 50, 100, the cavities 80, 130 themselves may provide such clearance-type spaces between the first and second plates 50, 100. This allows the first and second plates 50, 100 to move with respect to each other, radially, axially, torsionally, and/or otherwise, while being flexibly connected through the links 150 which, in operation, function to transmit torque from a driven one of the shafts 6, 7 to the other of the shafts 6, 7. The links 150 thus accomplish multiple functions, i.e. holding first and second plates 50, 100 together in an assembly; transmitting torque from one of the plates 50, 100 to the other, and flexing as necessary to accommodate shaft misalignment, movement and vibration.

Figure 5:
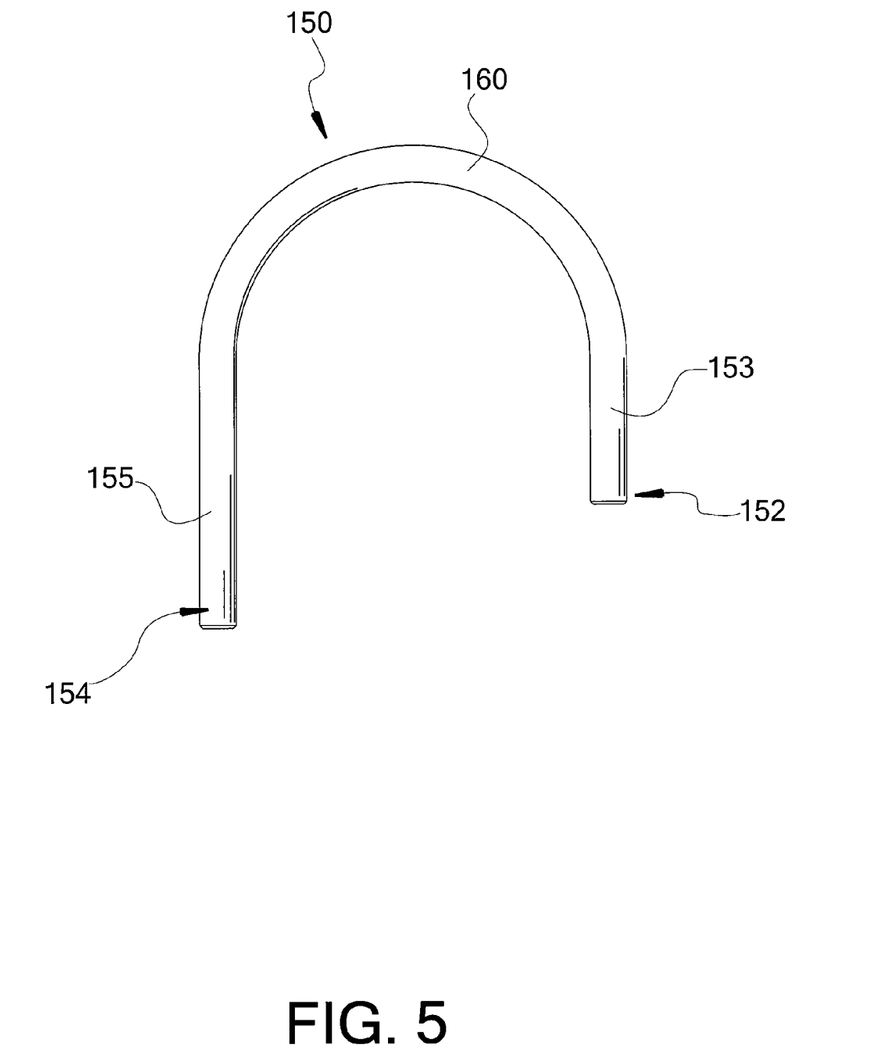
FIG. 5 is a front elevation view of a link incorporated in the shaft coupling system of FIG. 1.

Referring again to FIGS. 1 and 4, each link 150 has a first end 152 that is connected to the first plate 50 and a second end 154 that is connected to the second plate 100. As illustrated in FIG. 5, a first straight segment 153 extends from the first end 152. A second straight segment 155 extends from the second end 154. An intermediate curved segment 160 extends between and connects the first and second straight segments 153, 155 to each other. The curved segment 160 provides a generally U-shaped profile to the link 150.

Referring to FIG. 5, the second straight segments 155 of the links 150 are longer than the first straight segments 153. The relatively shorter first straight segments 153 extend into bores 61 that extend longitudinally through and are spaced from each other about a perimeter of the rim 60 of the first plate 50. The relatively longer second straight segments 155 of the links 150 extend into bores 111 that extend longitudinally through and are spaced from each other about a perimeter of the rim 110 of the second plate 100. The straight and curved segments 153, 155, 160 all extend generally orthogonally away from the outer end surface 62 of the first plate rim 60 and the inner end surface 118 of the second plate rim 110 and thus in directions that are generally parallel to the axis of rotation of the shafts 6, 7 and thereby the central axes of the first and second plates 50, 100. Apexes or outermost portions of the curved segments 160 face in the direction of shaft 6 and thus away from the second plate 100.

Referring now to FIG. 4, the links 150 extend angularly between the first and second plates 50, 100. The links 150 are spaced with respect to each other to provide circumferentially overlapping tangential loops that extend about the entire perimeters of the first and second plates 50, 100. In this way, each link 150 spans across a zone of connection 170 that is defined between connection points of the first end 152 to the first plate 50 and the second end 154 to the second plate 100. Adjacent zones of connection 170 overlap each other, with the second end 154 of each link 150 being positioned circumferentially or angularly past and radially outside of the first end 152 of a respective adjacent link 150. In this way, when viewed from an end view such as that of FIG. 4, each link 150 defines an imaginary line 156 that extends along the curved segment 160, connects the first and second ends 152, 154, and projects through an adjacent link 150. The particular angle, spacing, and/or other arrangement of the links 150 with respect to the first and second plates 50, 100 is selected to provide a desired amount of flex for the shaft coupling system 5 based on end-use parameters, as is the particular material, size, and configuration of each of the links 150. In operation, the ends of each link 150 tend to pinch together, such that each link flexes or bows slightly as torque is transmitted between plates 50, 100. The arcuate configuration of the links 150 evenly distributes stresses in each link 150 caused by such flexing and prevents stress concentrations and fatigue.

Referring now to FIGS. 2, 4, and 5, each link 150 may be made from a length of a substantially rigid material that can dynamically flex or bend away from and restore toward a neutral position, such as that shown in FIG. 4, to accommodate at least one of (i) axial misalignment of the shafts 6, 7, (ii)

radial misalignment of the shafts 6, 7, (iii) axial float of one or both of the shafts 6, 7, and/or (iv) torsional vibration(s) that may be transmitted through one or both of the shafts 6, 7. Such substantially rigid material may be a metal wire and representatively may be a relatively hard material such as, for example, a carbon steel drill rod material.

Still referring to FIGS. 2, 4, and 5, regardless of the particular material from which the links 150 are made, each link 150 has a length that is substantially longer than a distance(s) between the first and second plates 50, 100 so that during a maximum amount of relative movement between the first and second plates 50, 100, the links 150 bend or flex relatively small amounts as compared to their overall lengths. In one embodiment, clearances defined at the cavities 80, 130 (FIG. 3) between the first and second plate rims 60, 110 and between the first plate rim 60 and the second plate central portion 107 are each about 0.20 inch. In such an embodiment, each link 150 is made from a length of carbon steel drill rod or other substantially rigid material that is between about 4 and 6 inches in overall length, for example, about 5.2 inches in overall length. Referring to FIG. 5, the curved segment 160 may have a radius of curvature of between about 0.5 inch and 2 inches, for example, about 1 inch. The first straight segment 153 may be between about 1 inch and 2.5 inches in length, for example, about 1.4 inches. The second straight segment may be between about 0.5 inch and 1.5 inches in length, for example, about 0.75 inch. The link 150 may have an outside diameter of between about 0.1 inch and 0.25 inch, for example, about 0.19 inch. Such discretely positioned links 150 can bend so as to allow the first and second plates 50, 100 to move angularly, radially, and/or axially with respect to each other to accommodate relative movements of the shafts 6, 7 with respect to each other and while maintaining the shafts 6, 7 in a rotational driving and driven relationship with each other.

It is understood that numerous alternatives and variations are possible and are contemplated within the scope of the present invention. For example, and without limitation, it is understood that the shafts may be connected to the plates using any satisfactory connection arrangement other than the collars as shown and described. Representatively, the collars may be eliminated altogether and the shafts may be directly connected to the plates, such as by welding. In addition, the shaft engagement members or components, namely the plates 50, 100, may be replaced with any satisfactory structure that can be secured to and rotate with the shafts and that is capable of being interconnected using a series of links as shown and described. Furthermore, while the links 150 are shown and described as lying in a common plane between the first and second ends, it is contemplated that the links may include bends or other structure between the ends of the links. While the links are shown and described as being identically configured, it is further contemplated that the links may have varying configurations as desired. Accordingly, the links may have different overall shapes, such as curved segments of different radii than those shown, or compound curves that have different radii of curvature at different locations along the lengths of the curved segments. The links may include multiple curves per curved segment which may undulate or otherwise curve in different directions, helically curve, or curve about multiple axes at the curved segment(s). The links may be devoid of curved segments, and/or have different cross-sectional shapes than the round cross-sectional shape as shown, depending on, for example, the particular configuration(s) of the plates and/or desired performance characteristics of the shaft coupling system. In addition, while the links are shown and described as being connected to the axially facing end surfaces of the plates, the links could also be connected to the radially facing surfaces of the plates or to the end surface(s) and radially facing surface(s) in combination.

Various alternatives and embodiments are contemplated as being within the scope of the following claims particularly pointing out and distinctly claiming the subject matter regarded as the invention.

I claim:

1. A shaft coupling system comprising:
   a first shaft engagement member that can be connected to and rotate in unison with a first shaft;
   a second shaft engagement member that is located adjacent the first shaft engagement member and that can be connected to and rotate in unison with a second shaft; and
   a plurality of links, wherein each link has a first end that is connected to the first shaft engagement member and a second end that is connected to the second shaft engagement member so that torque can be transmitted between the first and second shaft engagement members through the links, wherein at least one of the links extends angularly between the first and second shaft engagement members and is resiliently bendable with respect to at least one of the first and second shaft engagement members and includes a curved segment that extends along an arcuate path that curves continuously between the first and second ends of the link so as to evenly distribute stress and avoid stress concentrations within the link.

2. The shaft coupling system of claim 1, wherein each link includes a length of substantially rigid material that can dynamically bend away from and toward a neutral position during rotation of the first and second shaft engagement members to accommodate at least one of (i) axial misalignment of the first and second shafts, (ii) radial misalignment of the first and second shafts, and (iii) axial float of the first and second shafts.

3. The shaft coupling system of claim 2, wherein the substantially rigid material is a metal wire that defines the curved segment of the link.

4. The shaft coupling system of claim 3, wherein the curved segment extends outwardly from at least one of the first and second shaft engagement members in a direction that is generally parallel to a central axis of the at least one of the first and second shaft engagement members.

5. The shaft coupling system of claim 4, wherein the curved segment defines a generally U-shaped profile.

6. The shaft coupling system of claim 2, wherein the links are spaced from each other and are positioned with respect to the first and second shaft engagement members so that the respective first ends of the multiple links are relatively nearer axes of rotation of the first and second shafts and respective second ends of the multiple links relatively further from the axes of rotation of the first and second shafts.

7. The shaft coupling system of claim 6, wherein the multiple links overlap and are angled with respect to each other so that each link defines an imaginary line that connects the first and second ends thereof and that projects through an adjacent link.

8. The shaft coupling system of claim 2, further comprising a first hub provided between and interconnecting the first shaft engagement member and the first shaft and a second hub provided between and interconnecting the second shaft engagement member and the second shaft.

9. A shaft coupling system comprising:
   a first shaft engagement member that can be connected to and rotate in unison with a first shaft, the first shaft engagement member defining an end surface that faces a first direction;

a second shaft engagement member that can be connected to and rotate in unison with a second shaft, the second shaft engagement member defining an end surface that faces the first direction; and multiple links that extend between and connect the end surfaces of the first and second shaft engagement member to each other, wherein at least one of the links includes a curved segment that extends along an arcuate path that curves continuously between a first end of the link engaging the first shaft engagement member and a second end of the link engaging the second shaft engagement member so as to evenly distribute stress and avoid stress concentrations within the link.

10. The shaft coupling system of claim 9, wherein the first and second shaft engagement members define first and second plates, respectively, and wherein each of the multiple links extends tangentially with respect to outer perimeters of the first and second shaft engagement members.

11. The shaft coupling system of claim 9, wherein each of the multiple links is in the form of a metallic loop that extends between the first and second shaft engagement members.

12. The shaft coupling system of claim 11, wherein the metallic loop of each of the multiple links defines a generally U-shaped perimeter.

13. The shaft coupling system of claim 9, wherein the first and second shaft engagement members are circular, and wherein the second shaft engagement member has a larger diameter than the first shaft engagement member so that an annular portion of the end surface of the second shaft engagement member extends radially outward beyond an outer perimeter of the first shaft engagement member, and wherein respective ends of the multiple links are connected to the annular portion of the end surface of the second shaft engagement member.

14. The shaft coupling system of claim 13, wherein the second shaft engagement member further comprises a cavity that extends axially into the end surface thereof, and wherein the first shaft engagement member extends at least partially into the cavity so that at least a portion of the first shaft engagement member is concentrically surrounded by at least a portion of the second shaft engagement member.

15. The shaft coupling system of claim 14, wherein the cavity of the second shaft engagement member extends radially inwardly from the annular portion of the end surface of the second shaft engagement member.

16. A shaft coupling system comprising:
a first shaft engagement member that can be connected to and rotate in unison with a first shaft, the first shaft engagement member defining an end surface that faces a first direction;

a second shaft engagement member that can be connected to and rotate in unison with a second shaft, the second shaft engagement member defining an end surface that faces the first direction;

multiple links that extend between and connect the end surfaces of the first and second shaft engagement members to each other;

wherein the first and second shaft engagement members are circular, and wherein the second shaft engagement member has a larger diameter than the first shaft engagement member so that an annular portion of the end surface of the second shaft engagement member extends radially outward beyond an outer perimeter of the first shaft engagement member, and wherein respective ends of the multiple links are connected to the annular portion of the end surface of the second shaft engagement member;

the second shaft engagement member further comprises a cavity that extends axially into the end surface thereof, and wherein the first shaft engagement member extends at least partially into the cavity so that at least a portion of the first shaft engagement member is concentrically surrounded by at least a portion of the second shaft engagement member; and wherein the first shaft engagement member further comprises a cavity that extends axially into an opposing end surface that faces toward the second shaft engagement member, at least a portion of the second shaft engagement member extending into the cavity of the first shaft engagement member.

17. A shaft coupling system comprising:
a first shaft engagement member that can be connected to and rotate in unison with a first shaft, the first shaft engagement member defining an end surface that faces a first direction;

a second shaft engagement member that can be connected to and rotate in unison with a second shaft, the second shaft engagement member defining an end surface that faces the first direction; and multiple links that extend between and connect the end surfaces of the first and second shaft engagement members to each other; and wherein each of the first and second shaft engagement members further comprises a rim defined at an outer perimeter thereof and that extends radially outside of a cavity, and wherein the end surfaces of the first and second shaft engagement members are defined upon the rims of the first and second shaft engagement members such that the multiple links connect the first and second shaft engagement members to each other at respective rims thereof.

* * * * *